United States Patent Office 3,483,685
Patented Dec. 16, 1969

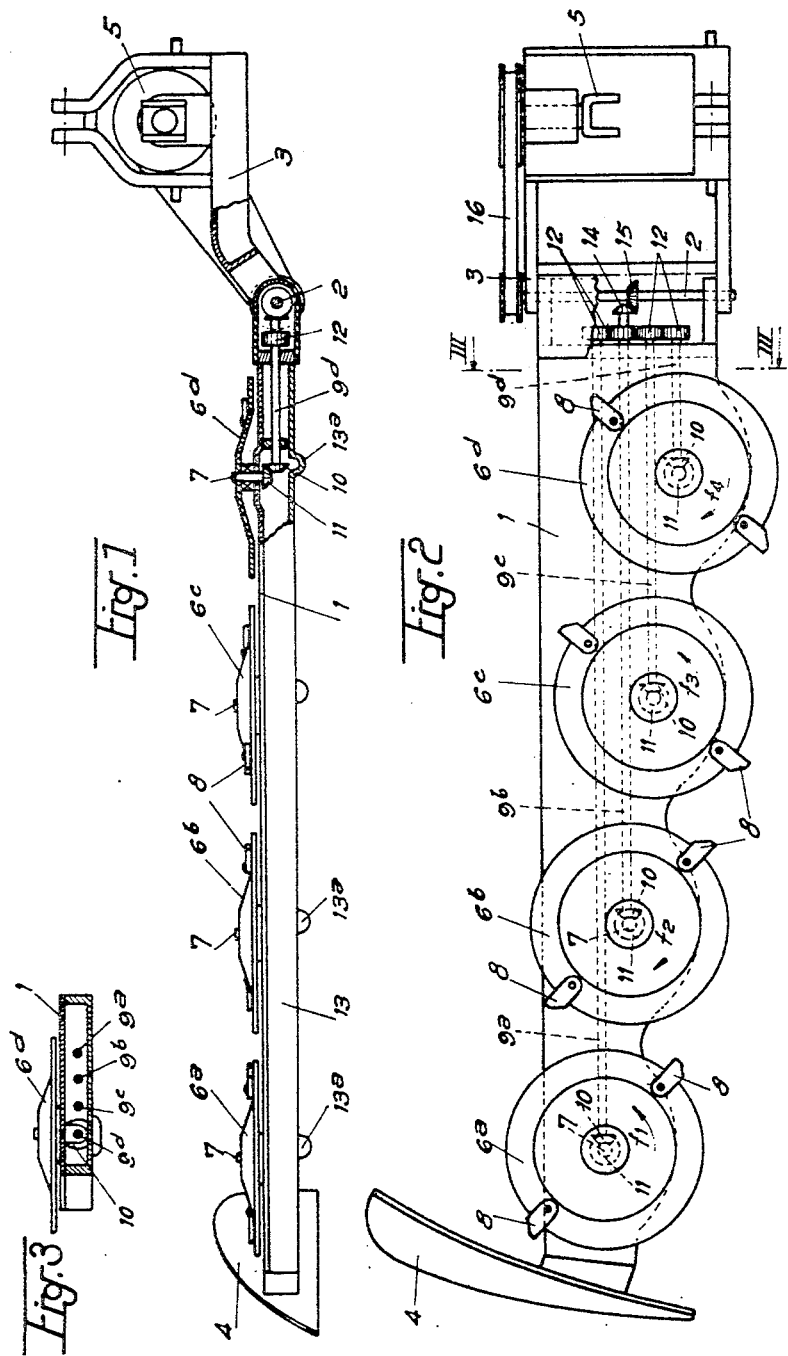

3,483,685
DISC MOWER
Jean Guillotin, Gael, France, assignor to Societe de Recherches et d'Exploitation d'Inventions Guillotin, Gael, France, a corporation of France
Filed Oct. 27, 1967, Ser. No. 678,575
Claims priority, application France, Nov. 3, 1966, 82,383
Int. Cl. A01d *69/14, 75/30*
U.S. Cl. 56—25.4                4 Claims

ABSTRACT OF THE DISCLOSURE

A disc mower having a substantially horizontal arm and a plurality of cutting discs mounted thereon for rotation about substantially vertical axes. Each disc is driven from one of a plurality of substantially parallel shafts extending longitudinally of the arm. The plurality of shafts are drivingly interconnected and driven from a common drive member.

---

This invention has for its object a disc mower of the type comprising a substantially horizontal arm which extends close to the ground and carries a series of discs which are driven in rotation about substantially vertical axes from a common drive member and at the periphery of which are mounted radial knives.

Machines of this type have already been proposed in which the knife-carrier discs are driven in rotation by means of an endless chain engaged on the one hand with a sprocket which is keyed on a common drive shaft and, on the other hand, with sprockets which are keyed respectively on the pivot-pin of each disc. In view of the high speed of rotation which must be imparted to the knife-carrier disc, this method of driving is nevertheless attended by a serious disadvantage in that the endless chain undergoes rapid extension under the action of the forces exerted thereon, thereby entailing length adjustments after only short periods of operation.

Another known method of driving the knife-carrier discs consists in mounting above these latter a main drive shaft which extends along the disc support arm and on which are keyed in the zone of the different discs bevel-pinions which are adapted to engage with other bevel-pinions keyed respectively at the top of the pivot-pin of each disc, the complete transmission system thus provided being enclosed within a casing. This arrangement is also subject to a disadvantage in that a relatively substantial projection is thus formed above the knife-carrier discs, with the result that the crops to be mown are deflected forward of the cutting line and satisfactory mowing cannot therefore be performed, especially in the case of short crops.

It has also been proposed in machines of the same type to drive the discs by means of a main drive shaft which is mounted parallel to the disc-supporting arm and coupled to the discs by means of separate shafts mounted transversely with respect to said arm, there being fitted at the ends of said separate shafts bevel pinions adapted to engage respectively with bevel pinions which are keyed respectively on the one hand on the main shaft and on the other hand above the different discs. In addition to the substantial size and mechanical complexity of this system, a further drawback arises from the fact that objectionable projections are thus formed above the knife-carrier discs.

The primary aim of the invention is to remove the disadvantages which have just been set forth. Accordingly, the disc mower in accordance with the invention is mainly characterized in that the different knife-carrier discs are driven by means of separate and substantially parallel shafts which extend longitudinally with respect to the support-arm and which are disposed beneath the discs inside a casing fitted beneath said support-arm, said longitudinal shafts being coupled respectively to the different discs by means of pairs of bevel pinions or the like and being coupled to each other at one end thereof by means of a motion-transmission mechanism which is coupled to a common drive member and which imparts to said shafts as well as to the corresponding discs movements of rotation which are preferably in opposite directions considered in pairs.

The disc-driving mechanism as thus consitituted does not in principle require any adjustment during operation, which is not the case with the known endless-chain drive system. Moreover, the casing which encloses the longitudinal shafts beneath the support-arm and the pinions which serve to couple said shafts respectively to the discs can be constructed in the form of a relatively flat chamber extending close to the ground over the entire length of the horizontal support-arm, so that the knives which are carried by the discs can directly reach the base of the crop to be mown without flattening the crop in front of the mower.

In the practical application of the invention, the motion transmission system which couples the longitudinal shafts together at one end can advantageously consist of spur pinions which are keyed on each of said shafts and engage successively with each other. By this simple expedient, said shafts and corresponding discs are driven in rotary motion in opposite directions in pairs.

In the case in which the mowing machine in accordance with the invention is hitched to a tractor, the common drive to the longitudinal shafts can be effected by means of a suitable mechanical transmission system coupled to one end of one of said shafts from the power take-off shaft of the tractor. In other forms of execution which are contemplated by the invention, the rotary drive to the longitudinal shafts can also be effected by means of a hydraulic system or the like which is coupled to one of said shafts; this drive system can be either independent or supplied from a power source carried by the tractor.

Further properties and advantages of the invention will become apparent from the complementary description which now follows, reference being had to the accompanying drawings which are given solely by way of example and not in any limiting sense, and in which:

FIG. 1 is a front elevation view with a portion broken away and showing one form of construction of the disc mower according to the invention;

FIG. 2 is a plan view corresponding to FIG. 1; and

FIG. 3 is a transverse sectional view of the support-arm, this view being taken along line III—III of FIG. 2.

In the example which is illustrated, the reference numeral 1 designates the support-arm of the mower which is pivotally coupled at one end by means of a shaft 2 to a frame 3 which is intended to be attached to the 3-point hitch system of a tractor in accordance with conventional practice and in such a manner as to ensure that the support-arm 1 should extend transversely with respect to the tractor, in a substantially horizontal position and at a short distance from the ground. At the end remote from the frame 3 which is coupled to the tractor, the arm 1 is preferably fitted with an outer shoe 4 of known type. The frame 3 is additionally fitted with a coupling device 5 which can be coupled by means of a cardan shaft (not shown in the drawings) to the power take-off shaft of the tractor.

In the exemplified embodiment, the arm 1 carries four knife-discs 6a, 6b, 6c, 6d which are suitably spaced along the length of said arm and which are mounted in such a manner as to be capable of rotating on said arm about substantially vertical pins 7. Each disc is fitted at its periphery with knives such as the knife 8 which may be two in number, for example, and which are disposed radially at diametrically opposite points, said knives being secured to the discs in such a manner as to be capable of retracting when they encounter an object such as a stone.

In accordance with the invention, the discs $6a$, $6b$, $6c$, $6d$ are driven in rotation by means of separate shafts $9a$, $9b$, $9c$, $9d$ which are substantially parallel and disposed longitudinally beneath the arm 1. Said shafts are coupled respectively to each disc by means of a bevel pinion 10 and this latter engages with another bevel pinion 11 which is keyed on the lower end of the shaft 7 of each disc. At the end adjacent to the hitch frame 3, the longitudinal shafts $9a$, $9b$, $9c$, $9d$ are coupled by means of spur pinions 12 which are in mesh with each other so that both said shafts and the corresponding knife-carrying discs are driven in rotation in pairs and in opposite directions. The direction of this movement of rotation is preferably determined so that the disc $6a$ which is located nearest to the outer shoe 4 rotates in the direction of the arrow $f_1$ in order to guide the crop towards the inner end of the mower whilst the disc $6d$ which is located next to the hitch frame 3 rotates in the direction of the arrow $f_4$ in order to prevent clogging at the level of the articulation of the arm 1. Furthermore, the keying of the discs relative to their respective drive shafts is so adjusted that the knives carried by two adjacent discs do not come into contact during the rotational motion of these latter.

The longitudinal shafts $9a$, $9b$, $9c$, $9d$ and the pairs of bevel pinions 10, 11 which serve to couple said shafts to the discs are housed in a flat removable casing 13 arranged beneath the arm 1. At the level of the pinions 10 which are carried by the longitudinal shafts, said casing is preferably provided on its bottom face with die-stamped recesses $13a$ in which said pinions are partially engaged, thereby making it possible in addition to reduce the height of said casing.

The longitudinal shafts are driven in rotation by a common drive member constituted in this example by a bevel pinion 14 keyed on the end of one of said shafts which is adjacent to the hitch frame 3. Said bevel pinion 14 is adapted to engage with a bevel pinion 15 which is keyed on the pivot-pin 2, said pin being rotatably mounted on the frame 3 in a suitable manner so as to constitute at the same time an intermediate drive shaft. The pivotal shaft 2 is in turn driven from the power take-off shaft of the tractor by means of a belt drive 16 or like system which connects said shaft to the coupling device 5.

In particular, the number of knife-carrier discs and corresponding longitudinal shafts could be other than four. Furthermore, as has been pointed out earlier, instead of being driven in rotation by a mechanical transmission system from the power take-off shaft of the tractor, the longitudinal shafts and the discs which are coupled thereto could be driven by a hydraulic system or the like which is either independent or supplied from a power source carried by the tractor.

What we claim is:

1. A disc mower of the type comprising a substantially horizontal support arm which extends close to the ground and carries a series of discs which are driven in rotation about substantially vertical axes from a common drive member and at the periphery of which are mounted radial knives, said mower being characterized in that the different knife-carrier discs are driven by means of separate and substantially parallel shafts which extend longitudinally with respect to the support-arm and which are disposed beneath the discs inside a casing fitted beneath said support-arm, said longitudinal shafts being coupled respectively to the different discs by means of pairs of gear means, and said shafts being coupled to each other at one end thereof by means of a motion-transmission mechanism which is coupled to a common drive member for imparting to said shafts as well as to the corresponding discs movements of rotation which are in opposite directions considered in pairs.

2. A disc mower in accordance with claim 1, characterized in that the motion-transmission mechanism which couples the longitudinal shafts to each other at one end thereof is constituted by spur pinions which are keyed on each of said shafts and adapted to engage successively with each other.

3. A disc mower in accordance with claim 1, characterized in that, the mower has hitch means for connection to a tractor, wherein the common drive for the longitudinal shafts comprises a mechanical transmission mechanism adapted to be coupled between one end of said shafts and a power take-off shaft of the tractor.

4. A disc mower in accordance with claim 1, characterized in that the gear means are beveled pinions.

References Cited

UNITED STATES PATENTS 3,389,537   6/1968   Zweegers _____ 56—25.4 XR

FOREIGN PATENTS 18,907   10/1892   Great Britain.
6709486   1/1968   Netherlands.

LOUIS G. MANCENE, Primary Examiner

JAMES A. OLIFF, Assistant Examiner

U.S. Cl. X.R.

56—6